Aug. 14, 1923.
J. J. LEONARD
1,465,014
AUTOMATIC VALVE TIMER AND CONTROL
Filed Jan. 24, 1921 3 Sheets-Sheet 1
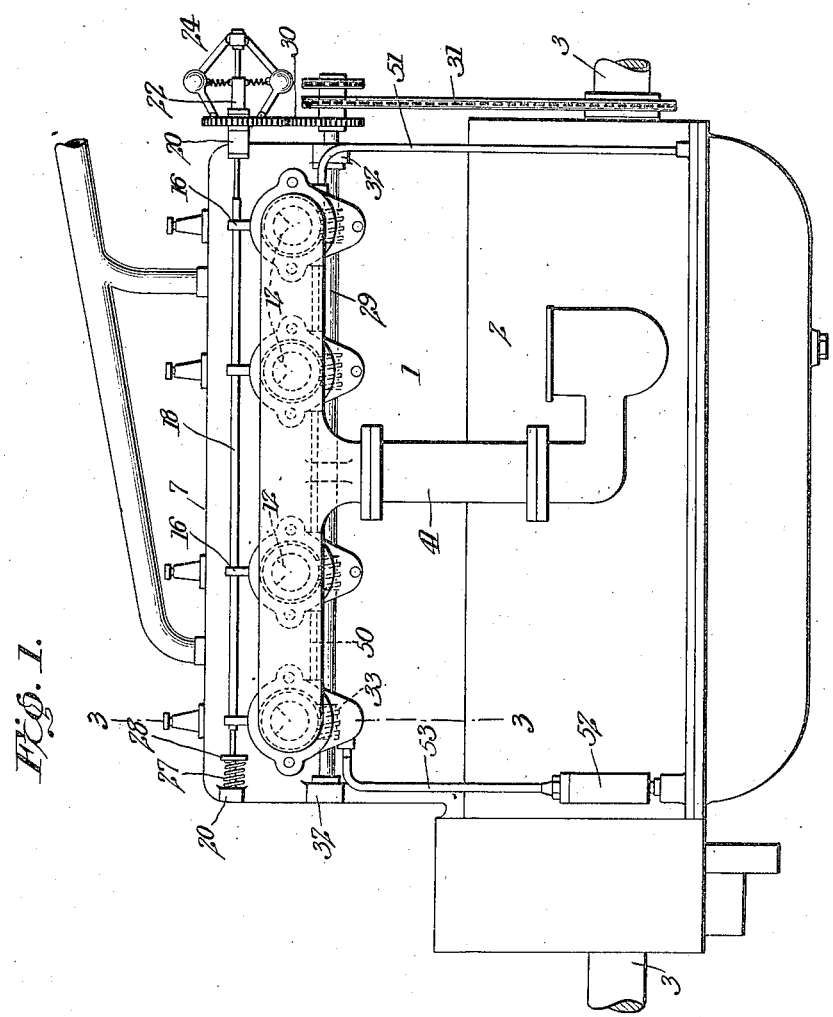

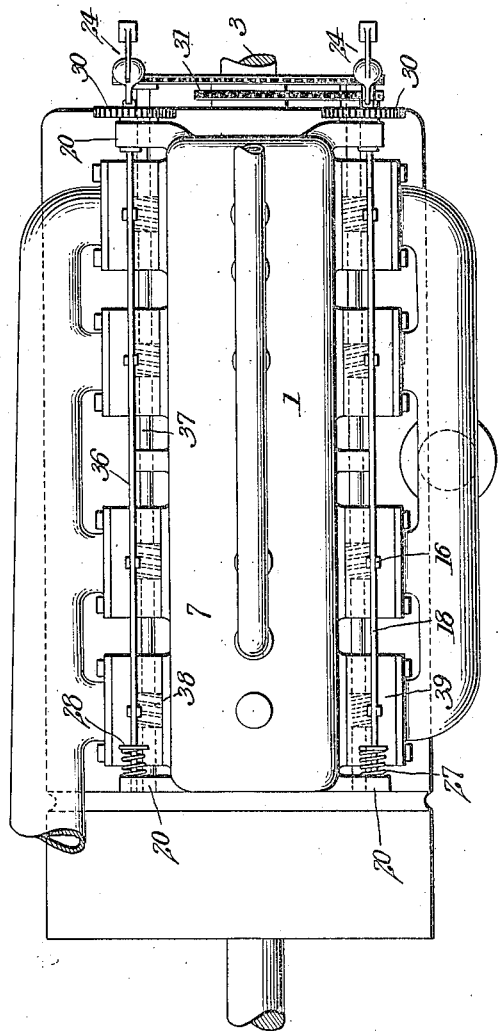

Aug. 14, 1923.
J. J. LEONARD
1,465,014
AUTOMATIC VALVE TIMER AND CONTROL
Filed Jan. 24, 1921    3 Sheets—Sheet 3
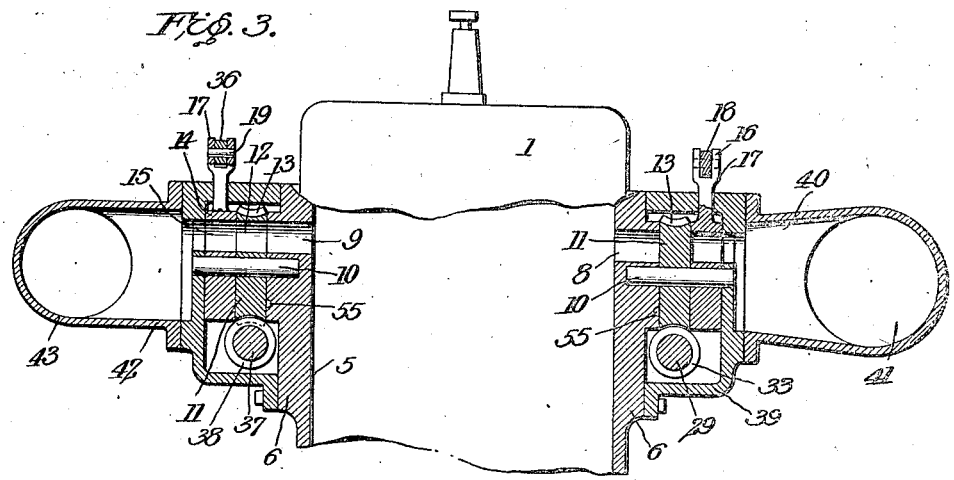
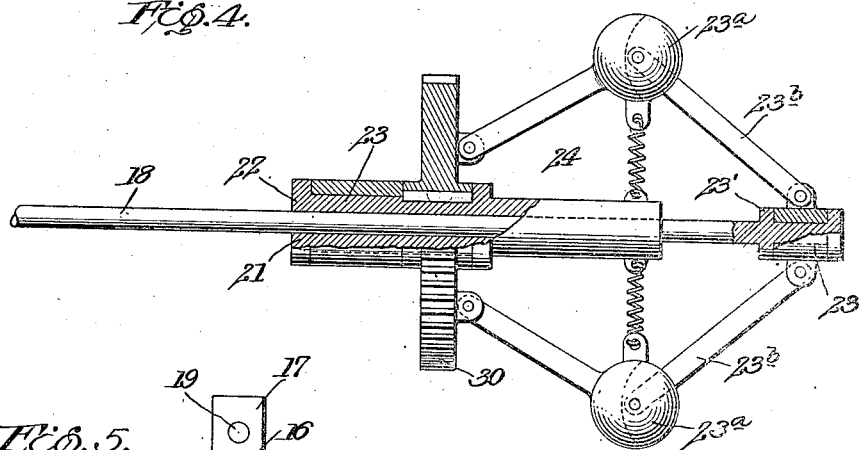
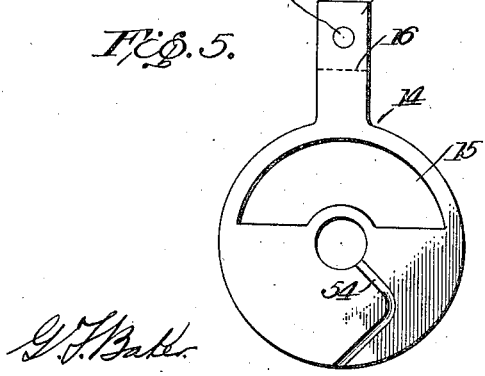
J. J. Leonard,
INVENTOR
BY Victor J. Evans
ATTORNEY
WITNESS:

Patented Aug. 14, 1923.

1,465,014

UNITED STATES PATENT OFFICE.

JOSEPH J. LEONARD, OF RANTOUL, ILLINOIS.

AUTOMATIC VALVE TIMER AND CONTROL.

Application filed January 24, 1921. Serial No. 439,558.

*To all whom it may concern:*

Be it known that I, JOSEPH J. LEONARD, a citizen of the United States, residing at Rantoul, in the county of Champaign and State of Illinois, have invented new and useful Improvements in Automatic Valve Timers and Controls, of which the following is a specification.

This invention relates to internal combustion engines and more particularly to the valve structures thereof, and an object of the invention is to provide valve structures and means for controlling and timing the operation of the valve structures for automatically regulating the supply of fuel to the cylinders of the engine and the exhaust of spent gases therefrom, dependent upon the speed of operation and the load of the engine.

More specifically, the invention comprehends the provision of a plurality of rotary valve discs, rotated from the crank shaft of the engine and provided with segmental openings to control the inlet and exhaust of the engine cylinder, and rockable valve discs operated from the crank shaft of the engine and governor controlled for automatically regulating the active sizes of the openings in the valve discs, by the rotation of the crank shaft of the engine.

A further object of the invention is to provide a valve structure as specified wherein the active openings of the inlet valves, or the time of regulation of the openings in the rotary and rockable discs, is proportionately increased as the speed of the engine increases and vice versa; and also wherein the openings of the exhaust ports is proportionately advanced as the speed of the engine increases or is retarded as the speed of the engine decreases, thereby permitting the utilization of the maximum amount of the expansive force of the fuel and also permitting thorough scavenging of the engine.

Other objects of the invention will appear in the following detailed description and in the accompanying drawings wherein:

Fig. 1 is a side elevation of an internal combustion engine provided with the improved automatic valve structure.

Fig. 2 is a top plan of an engine showing the improved valve structure applied.

Fig. 3 is a vertical section through the engine taken on the line 3—3 of Fig. 1.

Fig. 4 is a detail view, partly in section, of the governor.

Fig. 5 is a detailed view of one of the valve discs with the automatic valve structure.

Referring more particularly to the drawing the head 1 of the engine 2, which may be of any approved conventional type, and which has the usual crank shaft 3 rotatable by reciprocation of the pistons 4 of the engine and from which crank shaft 3 the power is taken. The side walls 5 of the head 1 of the engine are provided with bosses 6 on their outer surfaces at spaced distances along their length, the said bosses being properly spaced relative to the cylinders 7 of the engine to permit the forming of the inlet and exhaust openings 8 and 9 respectively therein in proper relation to the cylinder. The outer surfaces of the bosses 6 are preferably finished and studs 10 project outwardly from the centers of the bosses, and rotatably support disc valves 11. The disc valves 11 are provided with segmental openings 12, and they have worm gear teeth 13 on their peripheries for rotating the discs 11, to bring the openings 12 in registration with the openings 8.

Control discs 14 are rotatably mounted upon the studs 10 and engage the outer sides of the discs 11. The control discs 14 are provided with segmental openings 15 adapted for registration with the openings 12 and inlet openings 8, for controlling the supply of fuel to the cylinders 7 or the exhaust of the fuel from the cylinders 7. Each of the control discs 14 has a radiating arm 16 thereon, the outer end of which is forked, as shown at 17 and connected to a rod 18, in any suitable manner, preferably by means of diametrically extending pins 19. The rod 18 is slidably supported by suitable bearings 20 formed on the head 1 of the engine 2 and has one end inserted in the longitudinal bore 21 of the governor shaft 22. The rod 18 has a block 23 mounted thereon and held against longitudinal movement relative to the rod by the annular flanges 23' formed upon the rod. The weights 23ª of the governor are connected to the block 23 by arms 23ᵇ and they are also connected to the governor drive sprocket 30 by suitable arms as is ordinary in governor construction. The governor drive sprocket 30 is rotatable relative to the rod 18 and thus as the weights 23ª of the governor mechanism spread the rod 18 will be moved longitudinally to rock the discs 14 to regulate the active sizes of the inlet openings of the engine in accordance with the speed of the engine so as to insure feeding of the proper quantity of combustible fuel thereto. In other words as the speed, or R. P. M., of the engine increases the control valve 14 is rocked to cause longer active registration of the openings 12 and 15. An expanding spiral spring 27 is mounted about the end of the rod 18 remote from the governor mechanism 24 and it engages against the head 28 formed on the rod and one of the bearings 20 for returning the discs 14 to their normal positions, upon the stopping of the engine and also for moving the discs 14 in a reverse direction, to that in which they are moved by the governor mechanism, as the speed of the engine is reduced thereby providing positive automatic control for the disc 14 for regulating the sizes of the inlet openings into the engine in accordance with the speed of the latter.

The governor mechanism 24 is rotated from the valve disc drive shaft 29 by means of a sprocket and chain drive structure 30 or if so desired, it may be driven by a train of gearing. The shaft 29 is connected by any suitable power transmission mechanism, such as sprockets and chain 31 from the crank shaft 3 of the engine.

The shaft 29 which is rotatably supported by the bearings 32, attached at spaced intervals to the engine head 1, has worms 33 thereon at spaced intervals which mesh with the worm gear teeth 13 on the valve discs 11 for rotating these valve discs to bring the ports or openings 12 into registration with the openings 8 and 15 to permit the inlet of fuel in the cylinder. The timing of the valves may be proportioned by the ratio of the sprockets in the transmission mechanism 31 and also by the ratio of worms 33 and worm gear teeth 13.

The control discs 14 on the exhaust side of the engine are operated by a rod 36 the operation of which is identical to the operation of the rod 18, and a shaft 37 is mounted along the exhaust side of the engine carrying worms 38 for rotating the valve discs 11 which control the exhaust ports of the engine. The discs 11, on the exhaust side of the engine, are rotated in the opposite direction to the discs 11 on the intake side of the engine, by the worms 38, which are cut opposite to the worms 33, and this causes earlier opening of the exhaust valves during high speed of the engine.

The bosses 6 and valve disc 11 and control discs 14 are enclosed in suitable casings 39 which, on the inlet side of the engine, have arms 40 which connect to the inlet manifold 41, while on the exhaust side of the engine they have suitable branches 42 which communicate with the exhaust manifold 43.

The discs 14 fit snugly against the inner surfaces of the housings 39 and these housings, preferably, have a suitable lubricant in their lower portions, the height of the lubricant being regulated by the overflow pipes 50, which connect one housing to the other, and the return pipe 51, which connects the end housing to the crank casing of the engine. Oil is supplied to the housings 39 from the crank casing by a pump structure 52, of any conventional type, and through a supply pipe 53. The rockable discs 14 are provided with substantially L shaped grooves 54 in their faces which engage the discs 11 and these L shaped grooves open out at the periphery of the discs, substantially tangential of the circumference of the discs to cause them to pick up lubricant which will be drawn therethrough by the rotating action of the discs 11 for lubricating the outer surfaces of the rotating discs 11. The bosses 6 are also provided with lubricant feed grooves or ducts 55 similar to the grooves 54 and these curves 55 supply the necessary lubricant to the inner surfaces of the rotary discs 11.

It is, of course, to be understood that the invention may be constructed in various other manners and the parts associated in other relations and, therefore, I do not desire to be limited in any manner except as set forth in the claims hereunto appended.

Having thus described my invention what I claim is:

1. The combination with an internal combustion engine including inlet and exhaust ports and a crank shaft, of control discs for controlling the active area of said inlet and exhaust ports, a rod connected to said control discs, a governor mechanism for moving said rod longitudinally in one direction to move said control discs, power transmission means connecting said governor and crank shaft, and a spring for moving said rod and control discs in the direction opposite to their direction of movement under action of said governor.

2. The combination with an internal combustion engine including inlet and exhaust ports and a crank shaft, of control discs for controlling the active area of said inlet and exhaust ports, a rod connected to said control discs, a governor mechanism for moving said rod longitudinally in one direction to move said control discs, power transmission means connecting said governor and crank shaft, a spring for moving said rod and control discs in the direction opposite to their direction of movement under action of said governor, valve discs for controlling the inlet and exhaust of fuel to the engine, worm teeth formed upon the peripheries of said valve discs, a shaft rotated by said crank shaft, and worms on said shaft meshing with the peripheral worm gear teeth on said valve discs.

In testimony whereof I affix my signature.

JOSEPH J. LEONARD.